United States Patent [19]

Flora

[11] Patent Number: 5,007,010

[45] Date of Patent: Apr. 9, 1991

[54] FAST BCD/BINARY ADDER

[75] Inventor: Laurence P. Flora, Covina, Calif.

[73] Assignee: Unisys Corp. (Formerly Burroughs Corp.), Detroit, Mich.

[21] Appl. No.: 844,488

[22] Filed: Mar. 25, 1986

Related U.S. Application Data

[63] Continuation of Ser. No. 696,831, Jan. 31, 1985, abandoned.

[51] Int. Cl.[5] .................................................. G06F 7/50
[52] U.S. Cl. ...................................... 364/771; 364/772
[58] Field of Search .................................. 364/771, 772

[56] References Cited

U.S. PATENT DOCUMENTS

| | | | |
|---|---|---|---|
| 3,991,307 | 11/1976 | Peddle et al. | 364/771 |
| 4,172,288 | 10/1979 | Anderson | 364/771 |
| 4,245,328 | 1/1981 | Negi et al. | 364/771 |
| 4,441,159 | 4/1984 | Hart | 364/771 |

Primary Examiner—David H. Malzahn
Attorney, Agent, or Firm—Nathan Cass; Mark Starr

[57] ABSTRACT

A fast BCD/Binary Adder in which provision is made for selectively performing either binary or BCD arithmetic operations using an approach in which, for BCD addition, an appropriate correction value is always caused to be added to one of the input operands and an appropriate correction value conditionally subtracted from the result where required to give a proper BCD result. High speed operation is achieved by merging the binary input logic with the correction logic so as to provide for addition of the correction value concurrently with the addition of the input operands in a manner which automatically takes into account any inter-bit carries that may be produced by the correction value. In addition, provision is made for concurrently producing conditional sums (one assuming the presence of an input carry and the other assuming the absence of a carry) in parallel with the performance of look-ahead carry operations. An output logical selection circuit merges the selection logic for selecting the correct conditional sum (in response to the look-ahead carry produced) with the conditional subtraction logic required for BCD operation in a manner so that the two operations are performed concurrently during BCD operations.

9 Claims, 10 Drawing Sheets

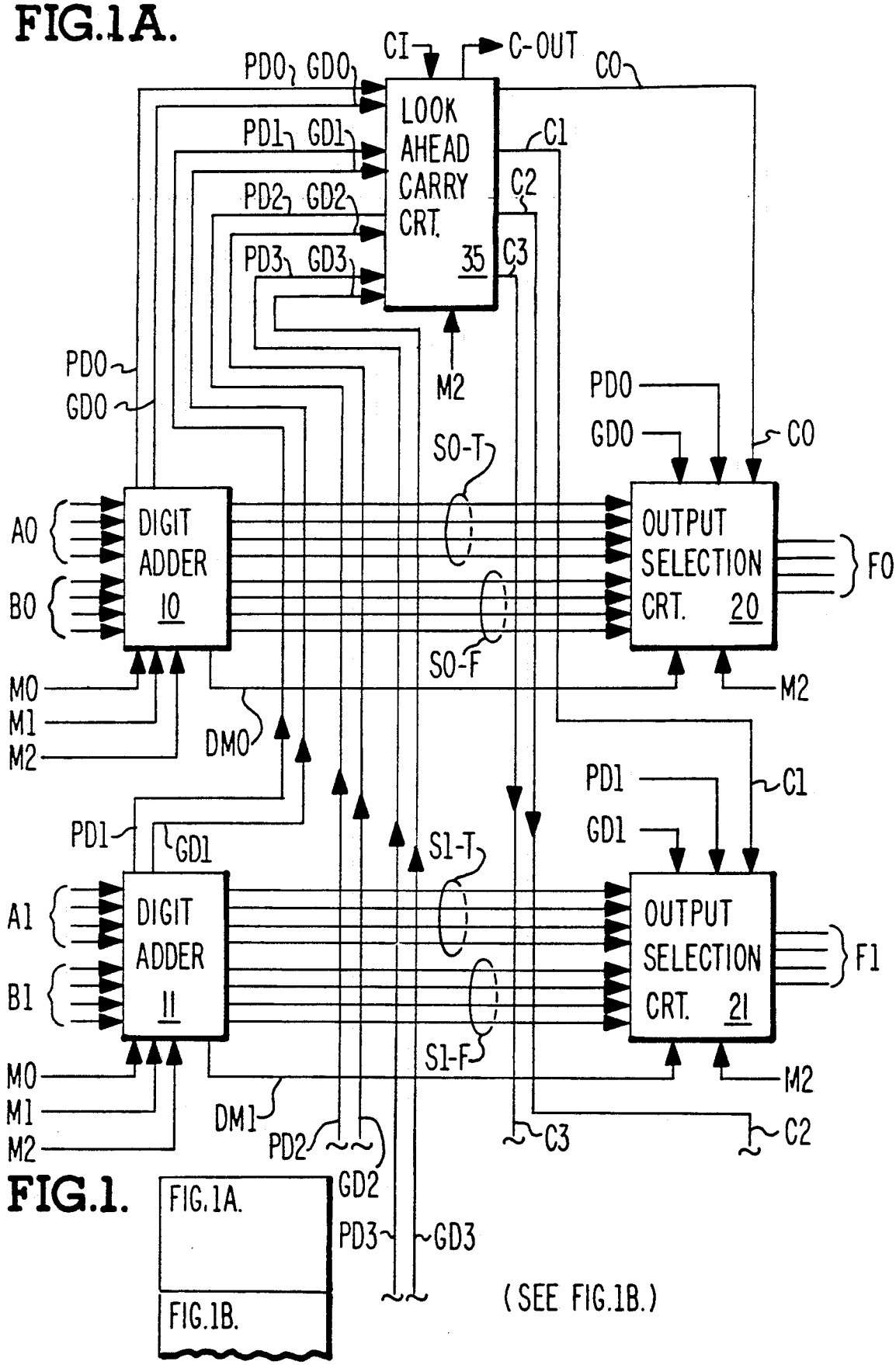

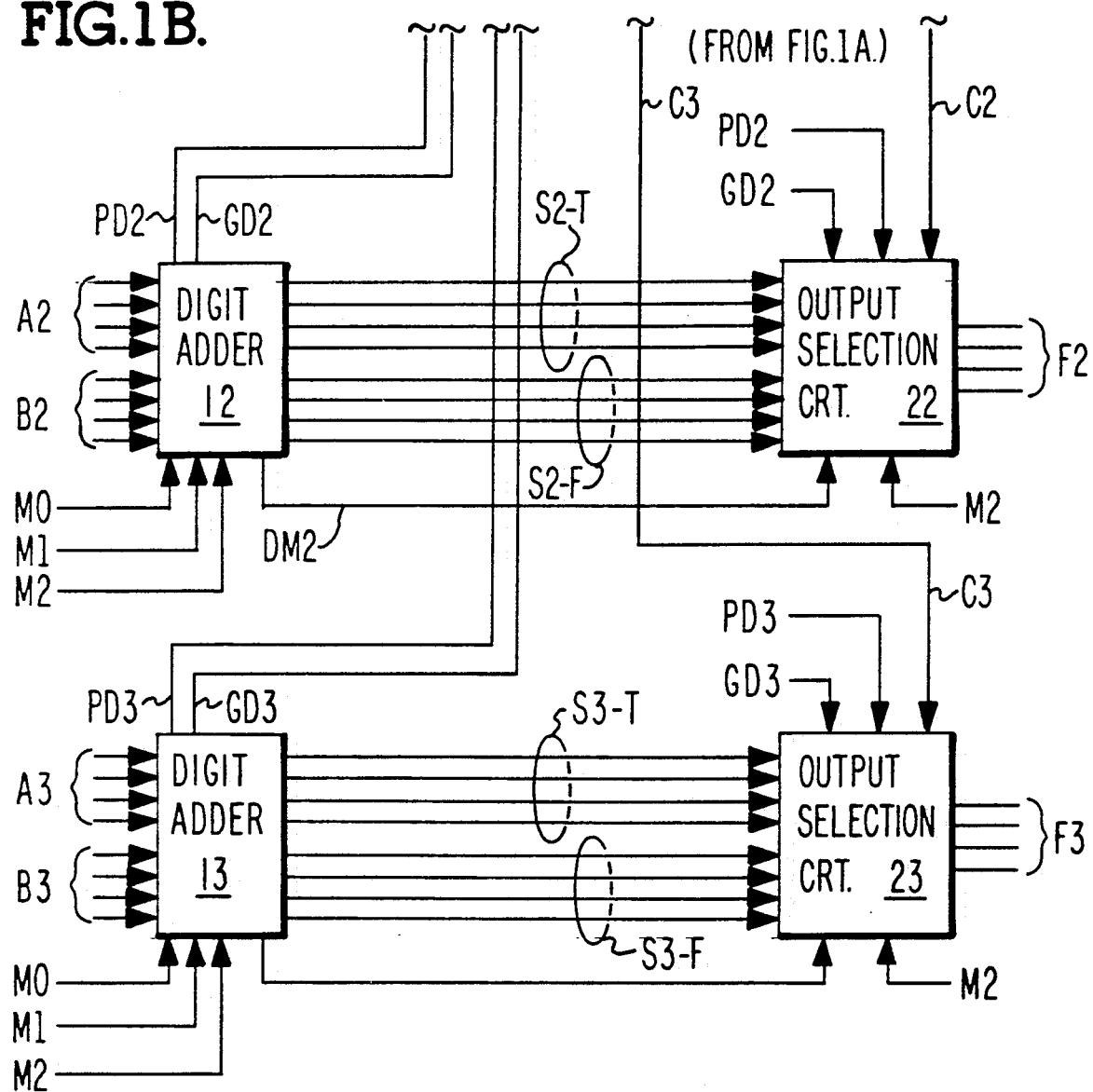

FAST BCD/BINARY ADDER

CROSS REFERENCE TO RELATED PATENT APPLICATIONS

I hereby claim the benefit under Title 35, United States Code, §120 of copending patent application Ser. No. 696,831, filed Jan. 31, 1985 now abandoned.

This patent application contains subject matter relating to my commonly assigned copending patent applications Ser. No. 707,913, filed Mar. 4, 1985 now abandoned, and Ser. No. 844,490, filed concurrently herewith.

BACKGROUND OF THE INVENTION

This invention generally relates to improved electronic circuitry for performing arithmetic and/or logical operations on multi-bit input operands representing numbers having different radices. More particularly, the invention relates to improved electronic circuitry providing for the performance of BCD and binary arithmetic operations in a digital data processing system.

In a digital data processing system, one of the most critical delay paths affecting overall processing speed is the path through the arithmetic/logic unit (ALU). The primary reasons are:

(1) the ALU is involved in most data processing operations, (2) an ALU typically involves a complex logical function requiring large numbers of gates, and (3) the current trend to larger data widths significantly increases carry propagate times even using look-ahead carry circuitry. Furthermore, where an ALU is additionally required to provide both binary and BCD operation, an additional increase in the delay path is to be expected because of the additional gates that would be required to implement the BCD logical functions.

For example, U.S. Pat. Nos. 4,172,288 and 3,958,112 illustrate known ways of providing BCD operation for an ALU. In U.S. Pat. No. 4,172,288, two BCD operands are added by first adding the operands as if they were pure binary numbers to produce an intermediate result. If this intermediate result is greater than nine, a correction value of six is added to obtain the correct BCD result. In U.S. Pat. No. 3,958,112, a reverse approach is employed in which the correction value of six is always added to one of the BCD operands before the operands are added as if they were pure binary numbers. If the intermediate result obtained from this binary addition is less than sixteen, then the correction value of six is subtracted from the intermediate result to obtain the correct BCD result. Although the approaches disclosed in these patents implement the BCD addition, they employ additional gates in a manner which significantly increases the delay of the path through the ALU.

One approach which has been employed in an attempt to reduce the delay of the ALU path when both binary and BCD arithmetic capability are required is disclosed in U.S. Pat. No. 4,441,159 issued Apr. 3, 1984. This approach is basically similar to that disclosed in the aforementioned U.S. Pat. No. 3,958,112 in which a correction value is always added to one of the input operands when a BCD operation is to be performed. In order to avoid the need for an extra stage to provide for addition of the correction value, the embodiment of U.S. Pat. No. 4,441,159 employs a plurality of multiplexers in the ALU input stage in a manner which provides for the addition of a correction value simultaneously with the addition of two input operands so as to produce carry propagate and carry generate signals for each corresponding pair of input operands dependent upon whether BCD or binary addition is to be performed. However, the correction value is added without taking into account any inter-bit carries which may have to be propagated to higher order bits as a result of the addition of the correction value with the input operand bits. As a result, a more complex and slower operating look-ahead carry circuit is required in order to provide an intermediate result which takes all of the inter-bit carries into account, thereby reducing the speed-up benefit achieved using the input multiplexers. Furthermore, the embodiment disclosed in U.S. Pat. No. 4,414,159 also requires extra incrementer stages for use in the event there is an input carry, and also a decimal adjustment stage in order to provide for subtraction of six where necessary to obtain a proper result. These additional stages further increase the delay of the path through the ALU.

SUMMARY OF THE INVENTION

In the light of the foregoing, a broad object of the present invention is to provide improved electrical circuitry for performing arithmetic and/or logic operations on multi-bit input operands representing numbers having different radices.

More particularly, the present invention is directed to improved electrical circuitry for selectively performing BCD or binary arithmetic operations in a digital data processing system.

A more specific object of the invention in accordance with the foregoing object is to selectively provide for the performance of either binary or BCD arithmetic operations in a manner which significantly reduces the time required for the performance of these arithmetic operations.

Another object of the invention in accordance with one or more of the foregoing objects is to provide an ALU which merges one or more stages into a common logic structure in a manner so that the time required for performance of the overall arithmetic operations is significantly reduced.

An additional object of the invention is to provide circuitry in accordance with the foregoing objects which is relatively simple and economical.

In a particular preferred embodiment of the invention, the basic approach employed for selectively performing either BCD or binary arithmetic operations is similar to that employed in the aforementioned U.S. Pat. Nos. 3,958,112 and 4,441,155—whereby, for BCD operation, a correction value (+6 for the case of addition) is caused to be added to one of the operands and a correction value conditionally subtracted from the result where necessary to give a proper BCD output value. However, this preferred embodiment differs from the embodiments disclosed in these aforementioned patents by merging particular stages into common logical structures in a manner such that the overall time required for the arithmetic operation is significantly reduced. More particularly, input logical circuits are provided which during BCD operation are able to provide for addition of an appropriate correction value concurrently with the addition of the input operands so as to produce propagate and generate signals in significantly less time than if the two operations were performed serially. Most importantly, however, unlike in the embodiment disclosed in U.S. Pat. No. 4,441,159, this input logical circuit provides for the production of propagate and generate signals which automatically take into account any inter-bit carries (or borrows in the case of subtraction) that may be produced as a result of the addition (or subtraction) of the correction value with the input operands, thereby making it possible to avoid the complexity and delay in the look-ahead carry (or borrow) operation which would otherwise be required to take such inter-bit carries (or borrows) into account.

In addition, this preferred embodiment achieves further reductions in the time required for selectively performing either BCD or binary arithmetic operations. This is achieved by providing for the concurrent production of two conditional sums (one sum assuming the presence of a carry and the other assuming the absence of a carry) in parallel with look-ahead carry operations, and then providing an output selection circuit which, during BCD operation, merges the selection operation for selecting the correct conditional sum (in response to the look-ahead carry produced) with the conditional subtraction operation for subtracting the correction value where required to obtain a proper BCD result, this merging being accomplished in significantly less time than as would otherwise be required.

Still further, the above described preferred embodiment can also accommodate both addition and subtraction operations as well as other types of logical operations.

The specific nature of the invention as well as other objects, features, advantages and uses thereof will become evident from the following detailed description of a particular improved embodiment taken in conjunction with the accompanying drawings.

BRIEF DESCRIPTION OF THE DRAWINGS

FIG. 1 is an electrical block diagram illustrating the overall structure of a particular preferred embodiment in accordance with the invention.

Like characters and numbers refer to like elements throughout the figures of the drawings.

Reference will initially be made to FIG. 1, which is an electrical block diagram illustrating the overall structure of a particular preferred embodiment in accordance with the invention. The structure of FIG. 1 is capable of selectively performing either binary or BCD arithmetic operations (addition and subtraction) on two 4-digit operands A and B having the digits A0, A1, A2, A3 and B0, B1, B2, B3, respectively. As shown in FIG. 1, each of these digits is comprised of 4 bits. Later on herein when particular preferred implementations are considered the bits for A0 and B0 will be designated as $A0_0, A0_1, A0_2, A0_3$ and $B0_0, B0_1, B0_2, B0_3$, respectively (for example, see FIG. 2).

As shown in FIG. 1, corresponding digit pairs A0, B0; A1, B1; A2, B2; and A3, B3 of the operands A and B are applied to respective digit adders 10, 11, 12 and 13 along with mode signals M0, M1, M2, and M3 which determine whether binary or BCD operation is to be provided as well as whether addition or subtraction of the operands is to be performed. These digit adders 10, 11, 12 and 13 produce respective pairs of conditional sum output signals S0-T, S0-F; S1-T, S1-F;- S2-T, S2-F; and S3-T, S2-F. As shown in FIG. 1, each of these sums comprise 4 bits. Later on, when particular implementations are considered, the bits for the pair of conditional sums S0-T and S0-F will be designated as $S0_0$-T, $S0_1$-T, $S0_2$-T, $S0_3$-T and $S0_0$-F, $S0_1$-F, $S0_2$-F, $S0_3$-F, respectively. The "T" sums designate those sums which assume the presence of a carry input, while the "F" sums designate those sums which assume the absence of a carry input. Both the "T" and "F" sums take into account any inter-carry bits which may be produced including those produced by the-correction signal during BCD operation. The mode signal M2 determines whether binary or BCD operation is to be performed, while the mode signals M0 and M1 determine whether addition or subtraction is to be performed. For the particular preferred embodiment illustrated in the drawings, these mode signals M0, M1 and M2 provide for selection of operations as follows:

Figure 2:
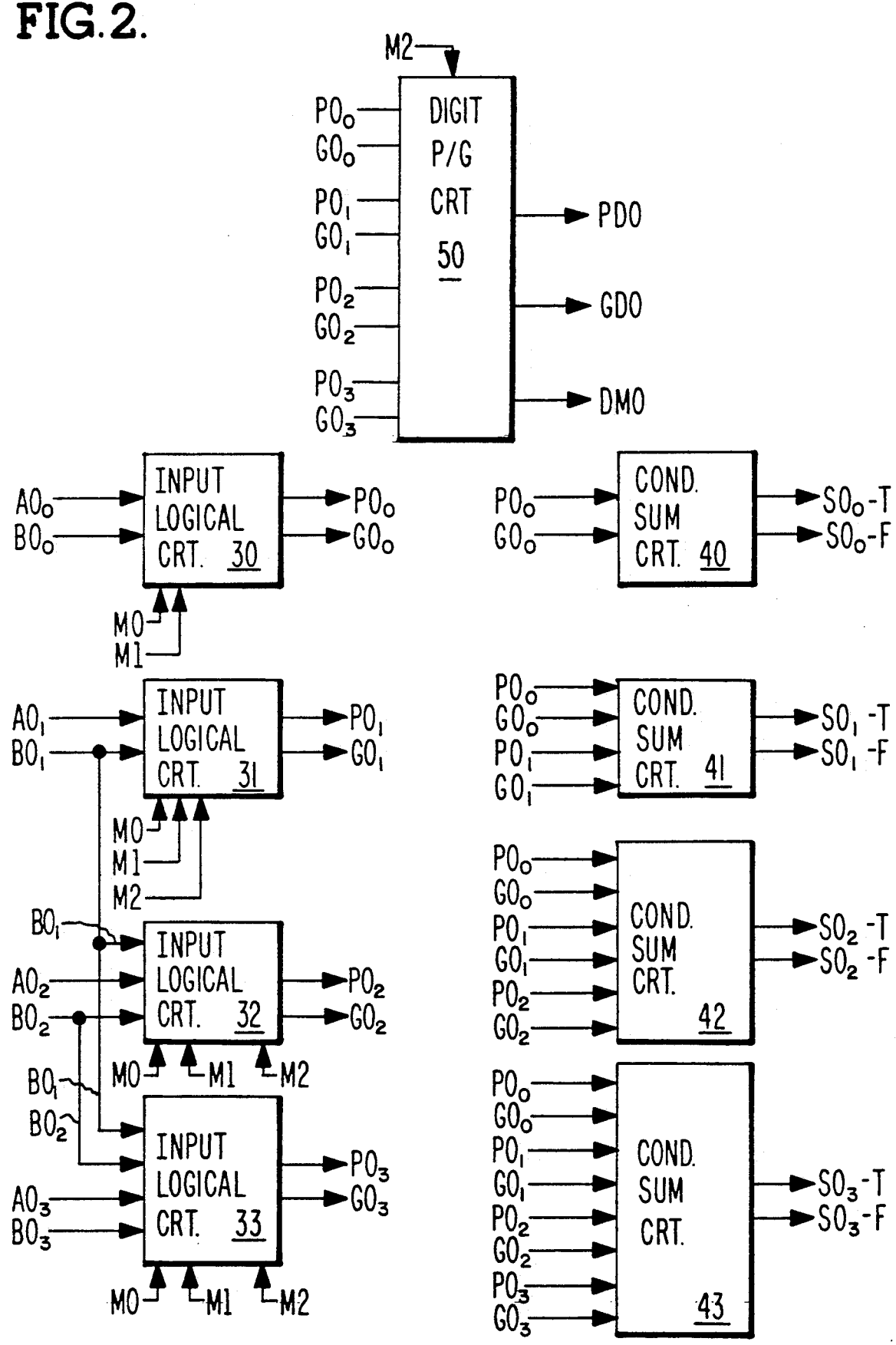
FIG. 2 is an electrical block diagram illustrating a particular preferred implementation of the digit adder 10 in FIG. 1.

| | |
|---|---|
| M2 = "1" | Perform binary operation |
| M2 = "0" | Perform BCD operation |
| M0 = M1 = "0" | Perform A + B |
| M0 = "1", M1 = "0" | Perform A − B |
| M0 = "0", M1 = "1" | Perform B − A |
| M0 = M1 = "1" | Perform 0 − B |

Continuing with the description of the embodiment illustrated in FIG. 1, it will be seen that the pairs of conditional output signals S0-T, S0-F; S1-T, S1-F; S2-T, S2-F; and S3-T, S3-F produced by the respective digit adders 10, 11, 12 and 13 are applied to respective output selection circuits 20, 21, 22 and 23. The digit adders 10, 11, 12 and 13 in FIG. 1 additionally produce respective decimal mode signals DM0, DM1, DM2 and DM3 (for use in the BCD operating mode) and also respective pairs of digit propagate and digit generate signals DD0, GD0; PD1, GD1; PD2, GD2; and PD3, GD3 which are to respective ones of the output selection circuits 20, 21, 22 and 23 along with respective pairs of conditional output signals S0-T, S0-F; S1-T, S1-F; S2-T, S2-F; and S3-T, S3-F. The decimal mode signals DM0, DM1, DM2 and DM3 provide for the selective incorporation of an appropriate correction value in the logic of the selection circuits 20, 21, 22 and 23 during BCD operation (such as, for example, providing for a subtraction of 6 during BCD addition when required to obtain the proper BCD result).

As shown in FIG. 1, the respective pairs of digit propagate and digit generate signals PD0, GD0; PD1, GD1; PD2, GD2; and PD3, GD3 are also applied to look-ahead carry circuitry 35 along with a carry-in signal CI which in response to these applied signals produces respective look-ahead digit carry signals C0, C1, C2 and C3 and a carry-out signal C-OUT. As shown in FIG. 1, the digit carry signals C0, C1, C2 and C3 are applied to respective ones of the output selection circuits 20, 21, 22 and 23.

In response to the signals applied thereto, the output selection circuits 20, 21, 22 and 23 produce the desired arithmetic result for the mode selected which result is indicated in FIG. 1 by output digit signals F0, F1, F2 and F3, each of which is comprised of 4 bits as shown in FIG. 1. Later on herein when particular preferred implementations are considered, the 4 bits of F0 will be designated as $F0_0$, $F0_1$, $F0_2$ and $F0_3$ (for example, see FIGS. 13-16).

Reference is next directed to FIGS. 2-7 which illustrate how each of the digit adders 10, 11, 12 and 13 in FIG. 1 is preferably implemented in accordance with the invention. Since each of these digit adders can be implemented in a like manner, FIGS. 2-7 are directed only to the implementation of the digit adder 10. The implementation of the other digit adders 11, 12 and 13 shown in FIG. 1 will be readily evident from FIGS. 2-7.

Referring first to FIG. 2, illustrated therein is an overall implementation of the digit adder 10 in FIG. 1 which receives the zero digits A0 and B0 of the input operands. As shown, each of these zero digits A0 and B0 comprises four bits designated as $A0_0$, $A0_1$, $A0_2$, $A0_3$ and $B0_0$, $B0_1$, $B0_2$, $B0_3$, which are respectively applied to input logical circuits 30, 31, 32 and 33 along with the mode signals M0, M1, M2 for use in producing respective pairs of propagate and generate signals $P0_0$, $G0_0$; $P0_1$, $G0_1$; $P0_2$, $G0_2$; and $P0_3$, $G0_3$. In addition, it is important to note that input logic circuit 32 also receives the bit signal $B0_1$ along with the bit signals $A0_2$ and $B0_2$, while input circuit 33 additionally receives both of the bit signals $B0_1$ and $B0_2$ along with the bit signals $A0_3$ and $B0_3$. This is done in order to permit the carry propagate and carry generate signals $P0_2$, $G0_2$ and $P0_3$, $G0_3$ produced by input logic circuits 32 and 33 to have values which take into account any inter-bit carries (or borrows in the case of subtraction) which may be produced by the correction signal during BCD operation, since it is these particular propagation and generate signals which can be changed as a result of the correction signal producing an inter-bit carry.

It is also to be noted in FIG. 2 that the mode signal M2 is not applied to the zero bit input logic circuit 30, since this bit will have the same value for both binary and BCD modes of operation.

In the particular preferred embodiment being described, the rules followed by each of the logic circuits 30, 31, 32 and 33 in FIG. 2 for producing the propagate and generate signals for an addition operation are as follows:

(1) A true or "1" propagate signal ($P0_0$, $P0_1$, $P0_2$ or $P0_3$) is produced if an input carry would produce an output carry taking into account (for BCD operation) the correction signal and any inter-bit carry which may be produced thereby—otherwise, a false or "0" propagate signal is produced; and (2) A true or "1" generate signal ($G0_0$, $G0_1$, $G0_2$ or $G0_3$) is produced if an output carry would be produced regardless of whether or not there is an input carry taking into account (for BCD operation) the correction signal and any inter-bit carry which may be produced thereby—otherwise, a false or "0" generate signal is produced.

Continuing with the description of FIG. 2, it will be seen that the propagate and generate signals $P0_0$, $G0_0$; $P0_1$, $G0_1$; $P0_2$, $G0_2$; and $P0_3$, $G0_3$, respectively produced by the input logic circuits 30, 31, 32 and 33 are applied to conditional sum circuits 40, 41, 42 and 43 for producing the zero digit conditional sums S0-T and S0-F shown in FIG. 1 which, from FIG. 3, will be seen to be comprised of the pairs of bits $S0_0$-T, $S0_0$-F; $S0_1$-T, $S0_1$-F; $S0_2$-T, $S0_2$-F; and $S0_3$-T, $S0_3$-F. As pointed out previously, the "T" sums are those which would be obtained assuming the presence of an input carry, while the "F" sums are those which would be obtained assuming the absence of an input carry.

As also pointed out previously, these conditional sums take inter-bit carries into account as well as those produced by the correction signal during BCD operation. As illustrated in FIG. 2, this is accomplished by applying to each of the conditional sum circuits 40, 41, 42 and 43 the propagate and generate outputs produced by its respective logic input circuit 30, 31, 32 or 33 and also the propagate and generate outputs produced by all previous logic input circuits. Accordingly, the conditional sum circuit 40 receives signals $P0_0$ and $G0_0$, the conditional sum circuit 41 receives signals $P0_0$ and $G0_0$, as well as signals $P0_1$ and $G0_1$, the conditional sum circuit 42 receives signals $P0_0$, $G0_0$, $P0_1$ and $G0_1$, as well as signals $P0_2$ and $G0_2$, and the conditional sum circuit 43 receives signals $P0_0$, $G0_0$, $P0_1$, $G0_1$, $P0_2$, and $G0_2$ as well as signals $P0_3$ and $G0_3$.

Still with reference to FIG. 2, it will be seen that all of the propagate and generate signals, namely $P0_0$, $G0_0$, $P0_1$, $G0_1$, $P0_2$, $G0_2$, $P0_3$ and $G0_3$, are also applied to a digit propagate/generate circuit 50 which, concurrently with the producing of the conditional sums by the conditional sum circuits 40, 41, 42 and 43, produces the zero digit propagate signal PD0, the zero digit generate signal GD0 and the zero decimal mode signal DM0. The PD0 and GD0 signals are applied to the look-ahead carry circuit 35 shown in FIG. 1, while the decimal mode signal DM0 is applied to the zero digit output selection signal circuit 20 in FIG. 1.

Reference is next directed to FIGS. 3-6 which respectively illustrate particular preferred embodiments of the input logic circuits 30, 31, 32 and 33 shown in FIG. 2. As previously described, these input logic circuits 30, 31, 32 and 33 operate on the zero digit operand inputs $A0_0$, $A0_1$, $A0_2$, $A0_3$ and $B0_0$, $B0_1$, $B0_2$ and $B0_3$ to generate signals $P0_0$, $G0_0$; $P0_1$, $G0_1$; $P0_2$, $G0_2$; and $P0_3$, $G0_3$ for both binary and BCD operations in a manner such that, when BCD operation is required, the addition of an appropriate correction value is performed concurrently with the addition (or subtraction) of the input operands while taking into account any inter-bit carries (or borrows) that may be produced by the correction signal.

Figure 3:
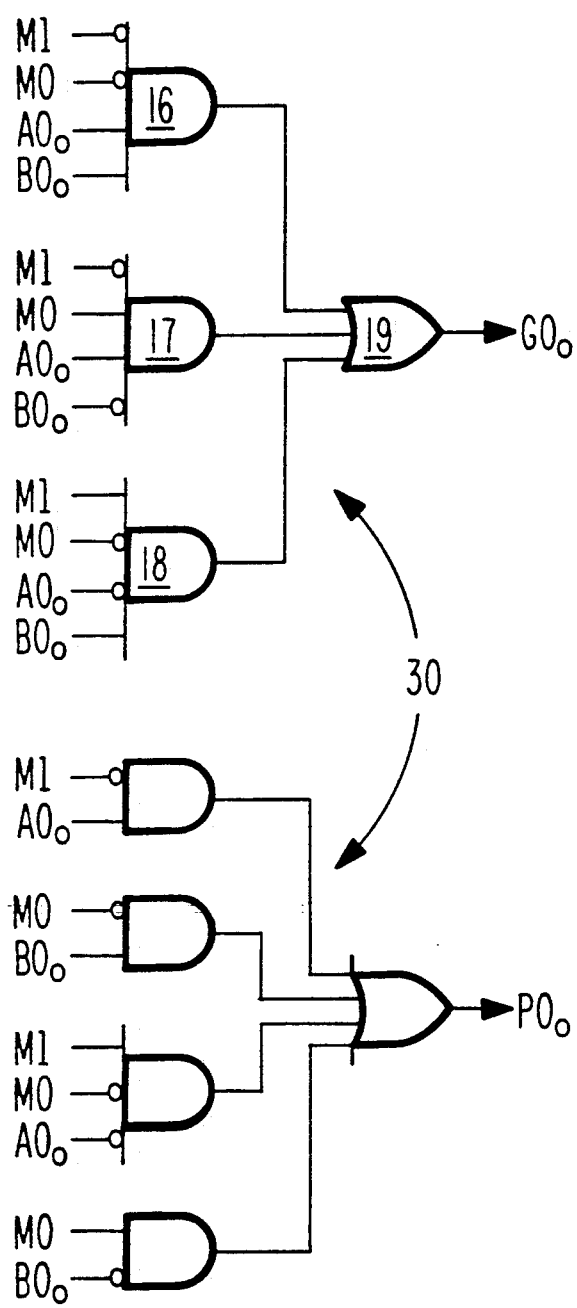
FIGS. 3–6 are logic diagrams illustrating particular preferred embodiments of the input logic circuits 30, 31, 32 and 33 in FIG. 2.
Figure 4:
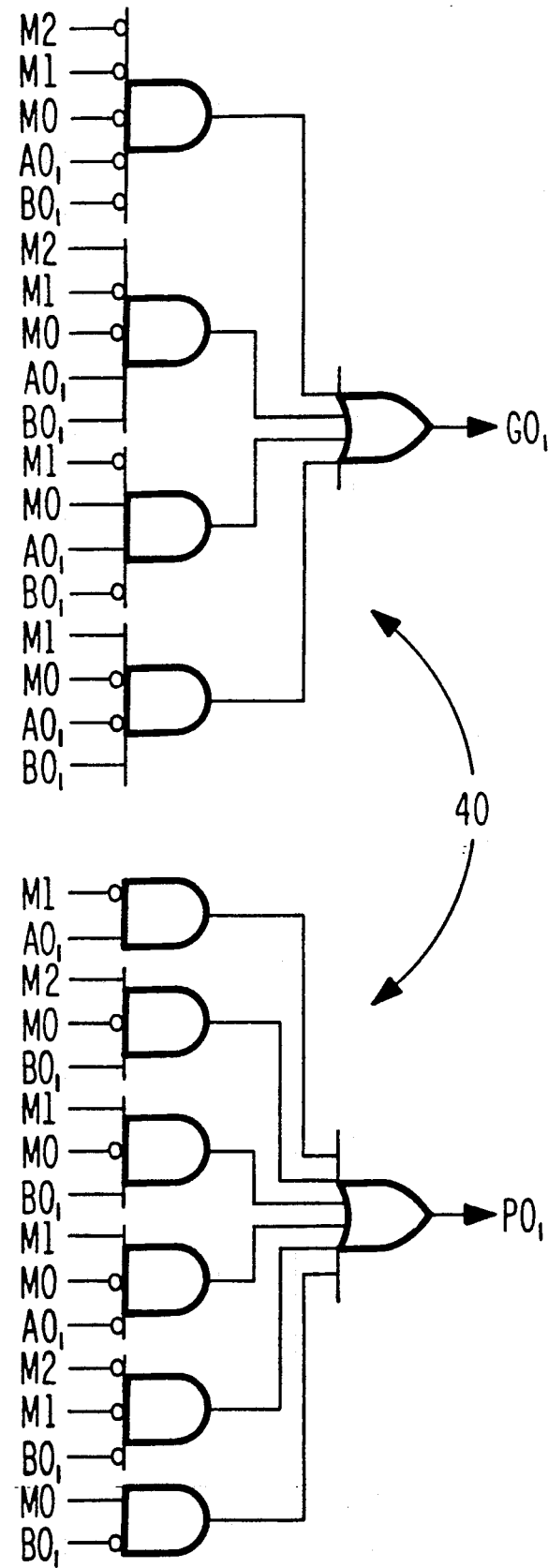
Figure 5:
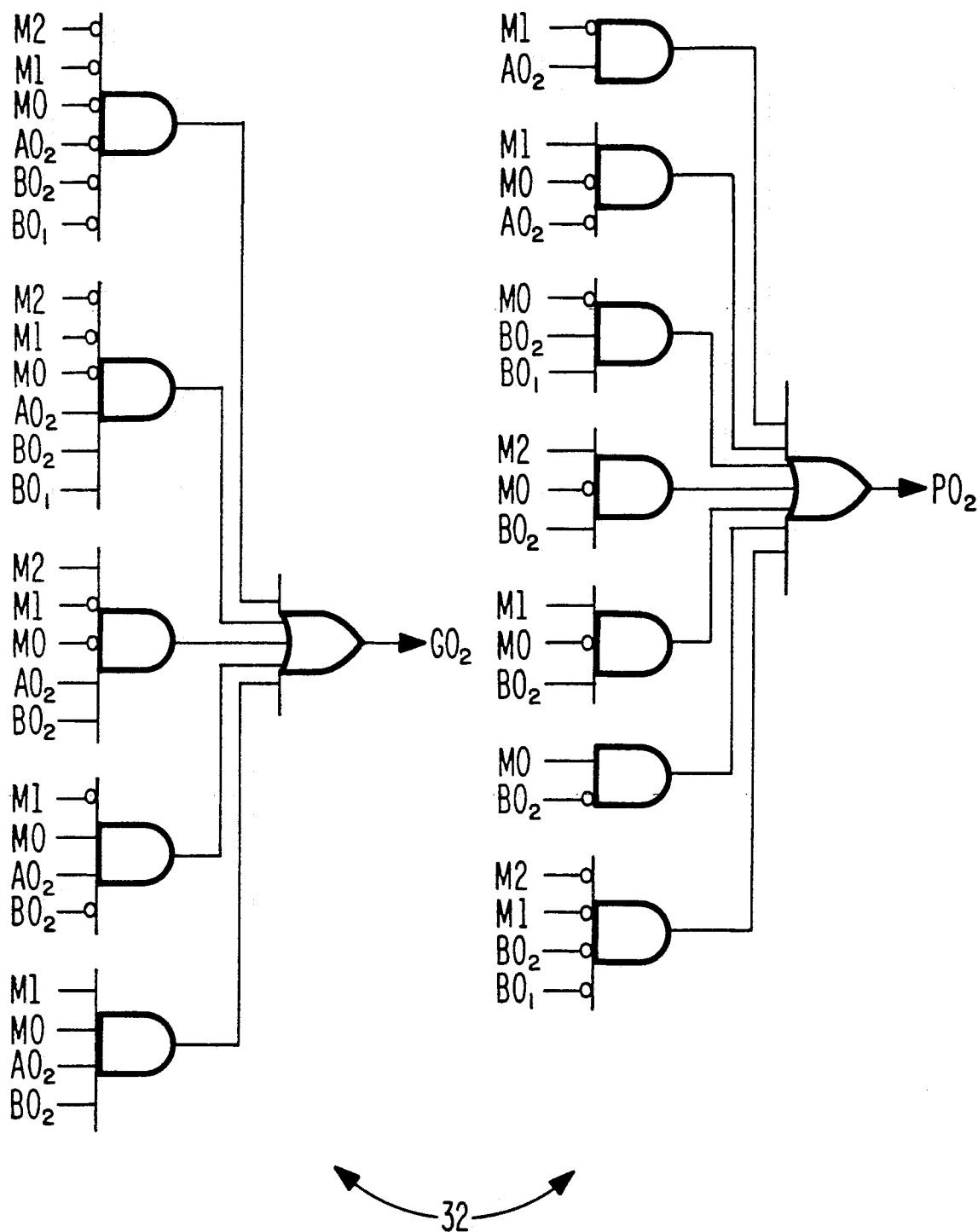
Figure 6:
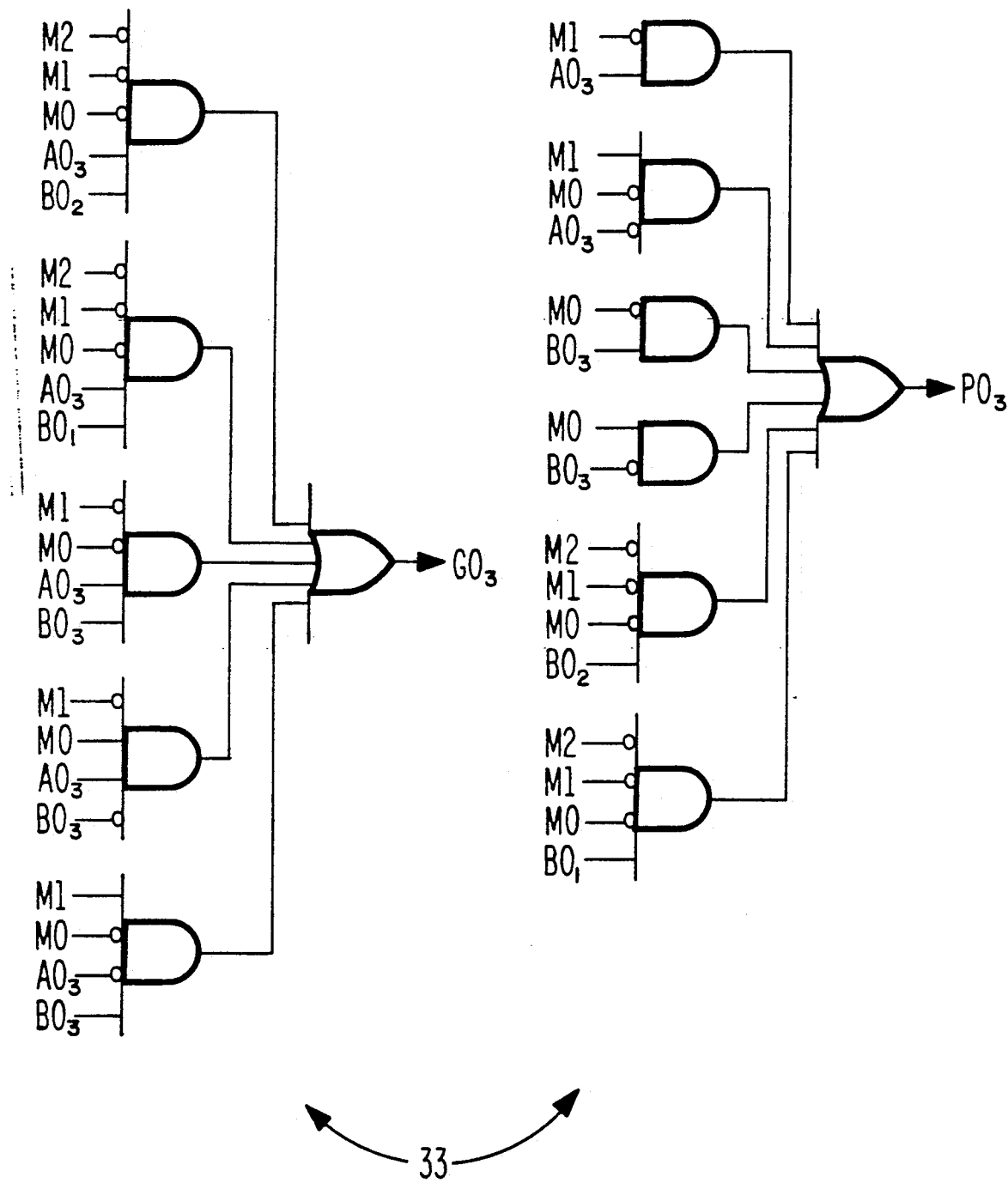
Figure 7:
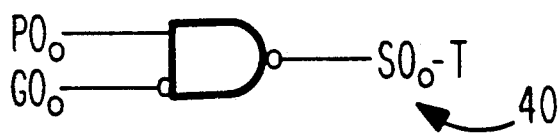
FIGS. 7–10 are logic diagrams illustrating particular preferred embodiments of the conditional sum circuits 40, 41, 42 and 43 in FIG. 2.
Figure 8:
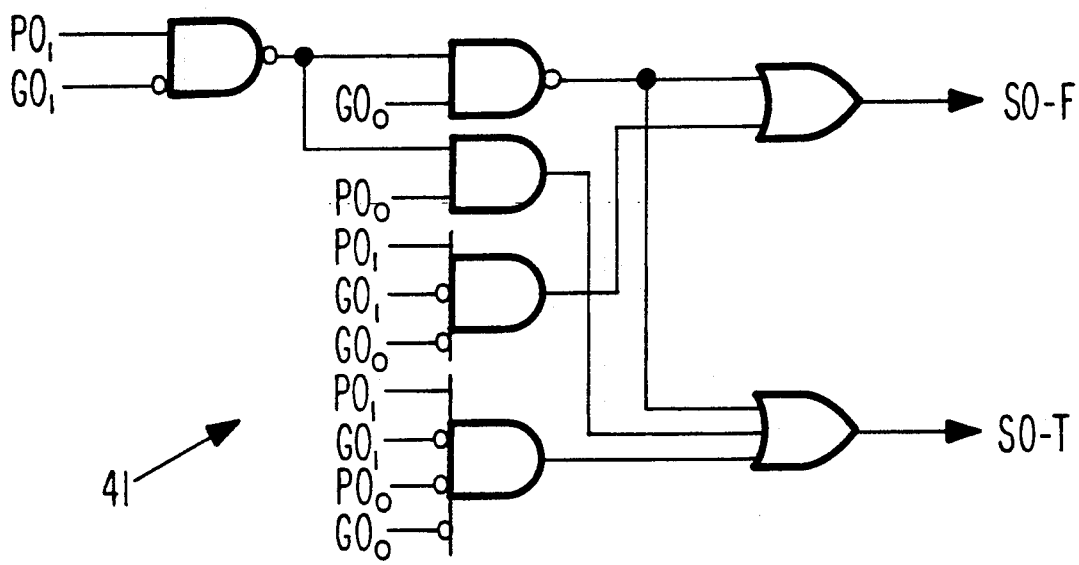
Figure 9:
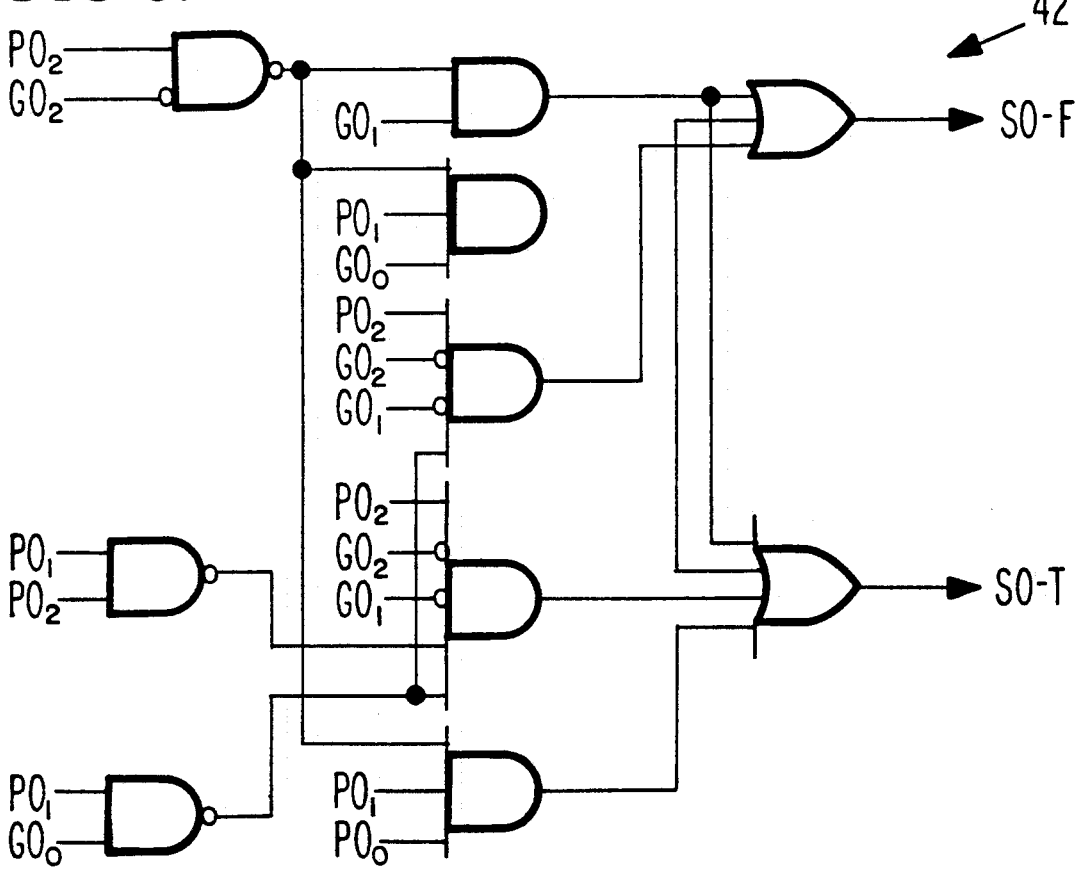
Figure 10:
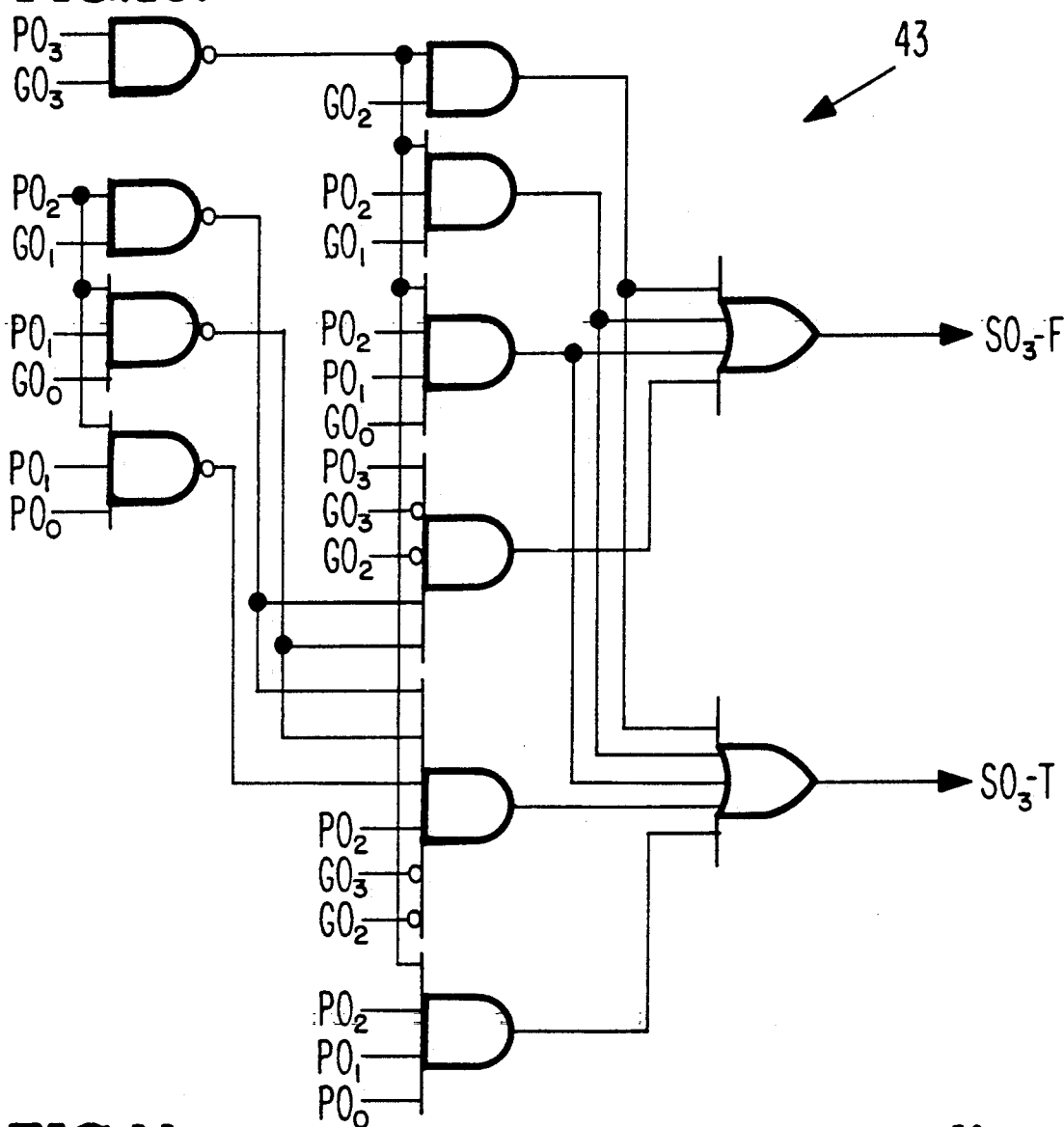

Considering FIGS. 3-6 more specifically, it will be seen that the BCD correction logic is merged with the binary arithmetic logic so that, for each of the input logic circuits 30, 31, 32 and 33, only a single level of AND gates having their outputs applied to respective common OR gates is required for producing the propagate and generate signals for BCD as well as binary operations (such as illustrated, for example, in FIG. 3 by AND gates 16, 17 and 18 feeding OR gate 19 for generating the signal $G0_0$). Since the number of gates through which a signal must pass is indicative of the delay of the path, it will be understood that only a 2 gate delay is introduced in order to produce each of the propagate and generate signals $P0_0$, $G0_0$; $P0_1$, $G0_1$; $P0_2$, $G0_2$; and $P0_3$, $G0_3$, which is the same as would normally be required if only binary arithmetic operations were to be performed.

The particular logical functions performed by each of the AND and OR gates shown in FIGS. 3-6 will readily be evident from the conventional AND and OR representations shown in these figures. This is also true for other like figures of the drawings. In this regard, it should be noted that, as is conventional, a "circle" input for an AND or OR gate indicates that the gate performs its logical operation on the inverse of the signal applied to such a "circle" input, while a "circle" output from an AND or OR gate indicates that the inverse of the gate output is obtained from such a "circle" output.

It should also be noted with respect to the particular preferred embodiments shown in FIGS. 3-6, that these embodiments provide for the BCD correction value of 6 to be added to the B operand. From the teachings provided herein, it will be evident how to provide an alternate embodiment in which this correction value is instead added to the A operand. From the teachings provided herein, it will also be evident how to provide other embodiments using different types of logical elements (e.g., using NAND and NOR logical elements) which likewise provide for the performance of the BCD correction operation without introducing any additional gate delays.

Reference is next directed to FIGS. 7-10 which respectively illustrate particular preferred embodiments of the conditional sum circuits 40, 41, 42 and 43 in FIG. 2 for producing the zero digit conditional sums $S0_0$-T, $S0_0$-F; $S0_1$-T, $S0_1$-F; $S0_2$-T, $S0_2$-F; $S0_3$-T, $S0_3$-F. As pointed out previously, these conditional sum circuits are not critical from a time viewpoint for the particular preferred embodiment being considered since the critical path is the look-ahead carry path whose operations are performed in parallel with the conditional sum operations. Thus, the operating speed of the conditional sum circuits 40, 41, 42 and 43 need only be equal or less than that required to produce the look-ahead carry which is relatively easy to accomplish in view of the relatively simpler logical operations required to be performed. Note that only the true sum $S0_0$-T is provided for the conditional sum circuit 40 since the false sum $S0_0$-F can readily be produced therefrom where required in later circuitry.

Figure 11:
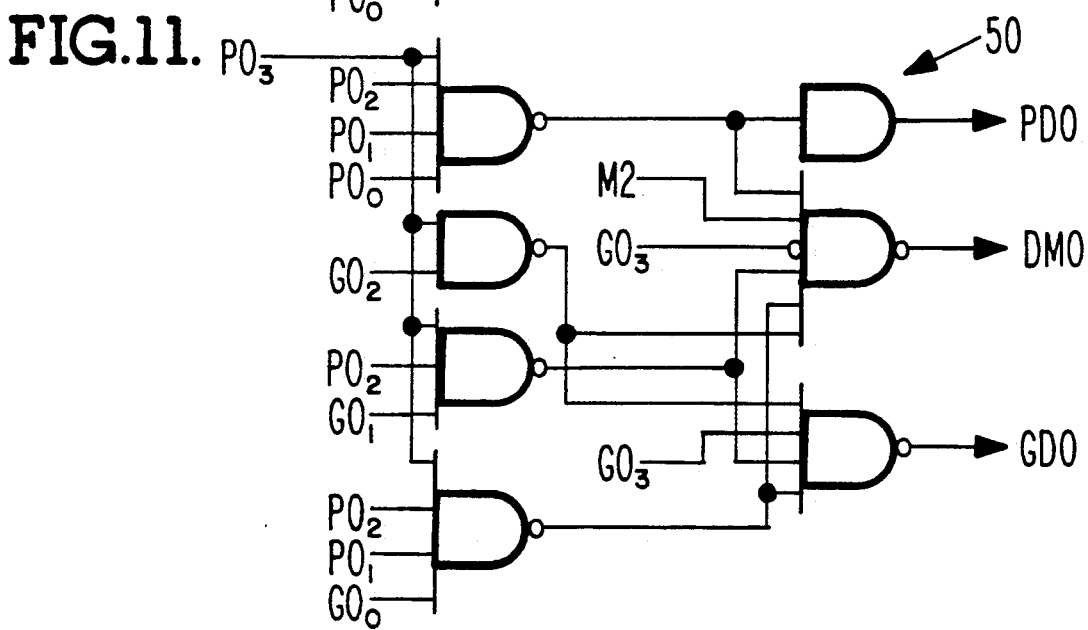
FIG. 11 is a logic diagram illustrating a preferred implementation of the digit propagate/generate circuit 50 in FIG. 2.

Reference is now directed to FIG. 11 which illustrates a particular preferred implementation of the digit propagate/generate circuit 50 illustrated in FIG. 2 which, concurrently with the producing of the conditional sums by the conditional sum circuits 40, 41, 42 and 43, produces the digit propagate and digit generate signals PD0 and GD0 as well as the zero digit decimal signal DM0. As shown in FIG. 1, the signals PD0 and GD0 are applied to the look-ahead carry circuit 30 in FIG. 11 (along with the other digit signals PD1, GD1, PD2, GD2, PD3 and GD3 produced by the other digit adders 11, 12 and 13 in FIG. 1), while the zero digit decimal signal DM0 is applied to the zero digit output selection circuit 20. Note in FIG. 11 that only a 2-gate delay path is required for producing the PD0, GD0 and DM0 signals. As will become evident, hereinafter, the production of the DM0 signal by the circuit 50 rather than later is advantageous in that it does not add to the overall delay time.

Figure 12:
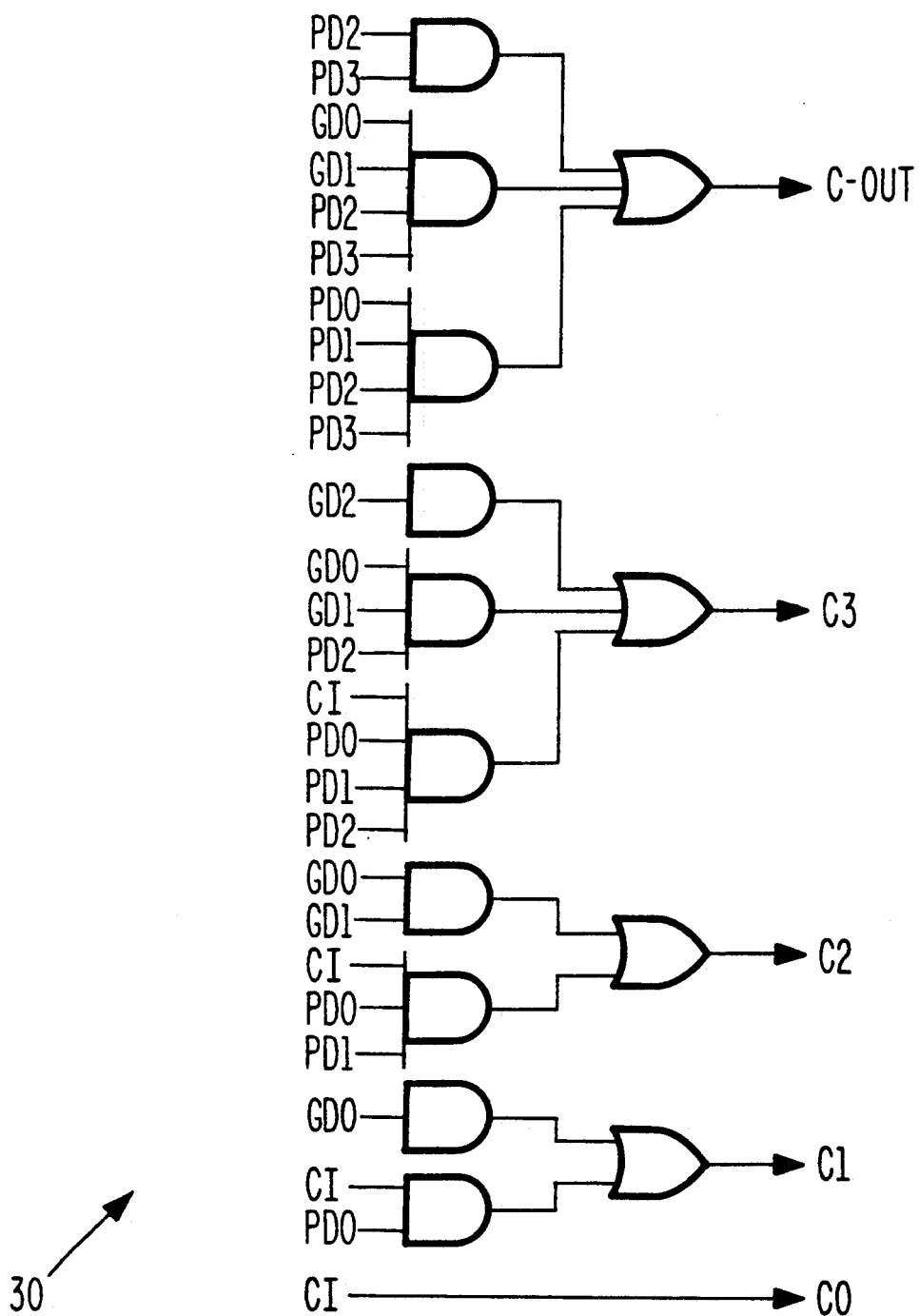
FIG. 12 is a logic diagram illustrating a particular preferred implementation of the look-ahead carry circuit 35 in FIG. 1.
Figure 13:
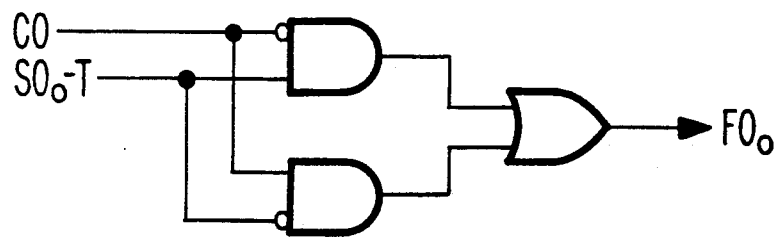
FIGS. 13–16 are logic diagrams illustrating a particular preferred implementation of the selection circuit 20 shown in FIG. 1.
Figure 14:
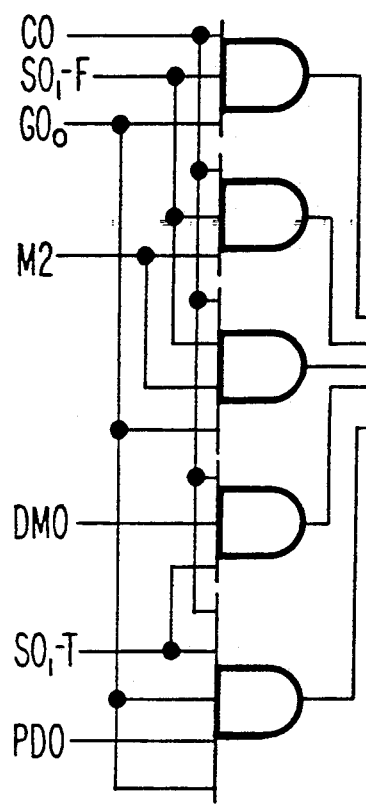
Figure 15:
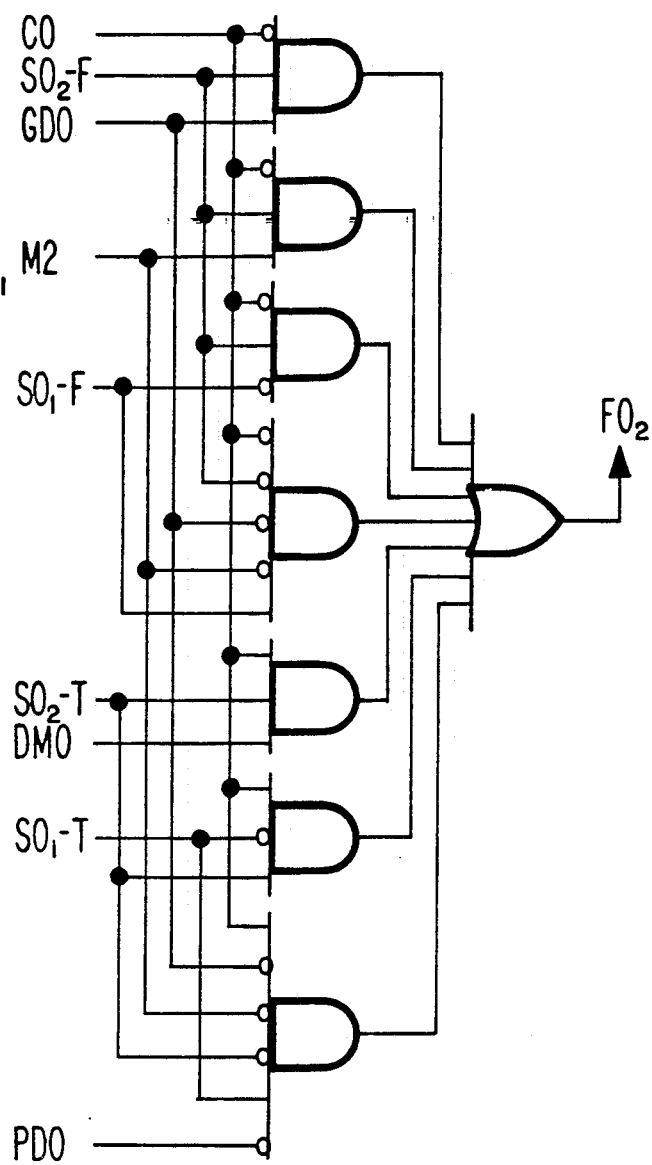
Figure 16:
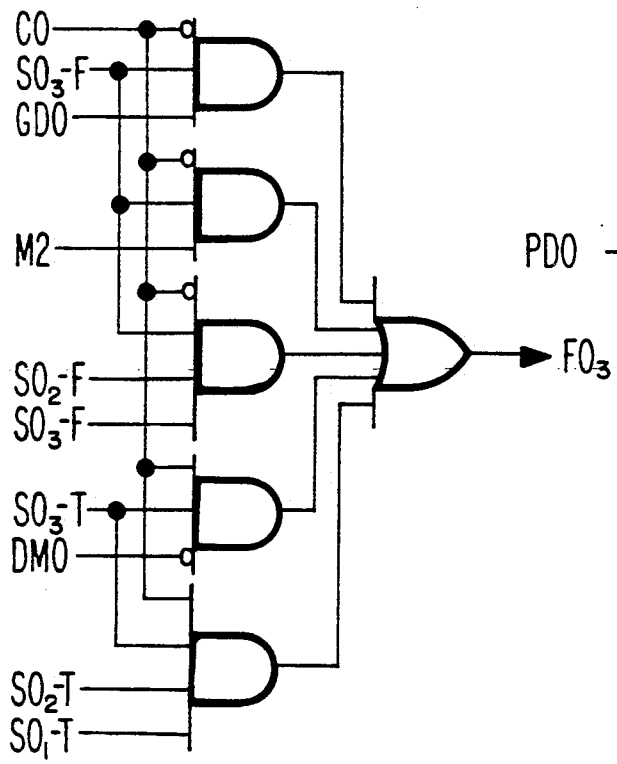

Having described with respect to FIGS. 2-11 a particular preferred implementation of the zero digit adder 10 in FIG. 1 (the other digit adders 11, 12, 13 and 14 having a like construction), attention is next directed to FIG. 12 which illustrates a particular preferred implementation of the look-ahead carry circuit in FIG. 1 for producing look-ahead digit carries C0, C1, C2, C3 and an output carry C-OUT in response to an input carry CI and digit propagate and generate signals PD0, GD0; PD1, GD1; PD2, GD2; and PD3, GD3. Note in FIG. 12 that the zero digit look-ahead carry C0 is merely the carry-in CI and that a look-ahead carry-out C-OUT is also produced which may, for example, be applied to higher order digit if present.

The remaining parts of FIG. 1 to be considered are the selection circuits 21, 22, 23 and 24 which produce the final arithmetic result represented by the digit output signals F0, F1, F2 and F3 (each of which comprises 4 bits as shown). As was the case for the digit adders 10, 11, 12 and 13, each of the selection circuits 21, 22, 23 and 24 may be of like construction. Accordingly, the particular preferred implementation of the zero digit selection circuit 20 shown in FIG. 1 for producing the F0 output (comprised of bits $F0_0$, $F0_1$, $F0_2$ and $F0_3$) should be considered as representative of the implementation of the other digit selection circuits 21, 22 and 23 in FIG. 1. Note in FIGS. 13-16 that the BCD correction logic is merged with the selection logic so that only a 2-gate delay is required for producing the bit output signals $F0_0$, $F0_1$, $F0_2$, $F0_3$ for both BCD and binary operations. In this regard, the advantage should now be recognized of having the decimal mode signals DM0, DM1, DM2 and DM3 produced concurrently with the respective digit propagate and generate signals PD0, GD0; PD1, GD1; PD2, GD2; and PD3, GD3 in each respective propagate/generate circuit, such as illustrated for the zero digit propagate/generate circuit 50 shown in FIGS. 2 and 11. Because they were previously produced, these decimal mode signals DM0, DM1, DM2 and DM3 are thus available at the inputs of the respective selection circuit inputs 20, 21, 22 and 23 as shown in FIG. 1 for use thereby without any added delay, as will be evident from FIGS. 13-16, whereby only a 2-gate overall delay is introduced by the selection circuits 20, 31, 22 and 23. Also note that, because each digit carry (which is C0 for selection circuit 20) is applied at the latest possible point—that is, directly to its respective selection circuit—the 2-gate delay of each selection circuit is all that is introduced from carry input to output. This is important since the digit carries C0, C1, C2 and C3 are normally the last to become available.

EPILOGUE

Although the present invention has been described with respect to particular preferred implementations, it is to be understood that many variations in construction, arrangement, operation and use are possible within the scope of the invention.

For example, although the description has primarily referred to addition, it is to be understood that the detailed logic shown is also applicable to performing the subtraction operations A-B, B-A and 0-B by appropriate choice of the mode signals M0, M1 and M2 as mentioned earlier. Also, other types of logical functions (such as, for example, the Exclusive OR of A and B) could be provided by the addition of one or more mode signals along with appropriate implementation.

Accordingly, it will be evident that the present invention is not to be limited to the particular embodiments disclosed herein, but rather is to be considered as encompassing all modifications and variations coming within the scope of the appended claims.

What is claimed is:

1. Arithmetic logic means for selectively performing binary or BCD operations on two digital multi-bit operands applied thereto, said arithmetic logic means comprising:
   means for receiving a mode signal indicative of whether binary or BCD operation is to be performed;
   input logic circuit means to which said operands are applied for producing corresponding pairs of propagate and generate signals;
   said input logic circuit means including binary arithmetic logic and BCD correction logic which are merged to provide for operation in response to said input operands and said mode signal so that, when BCD operation is indicated, correction logic operations are performed concurrently with arithmetic operations in a manner such that the propagate and generate signals produced take into account any inter-bit effects occurring because of correction logic operations; and
   means responsive to said propagate and generate signals for producing a binary or BCD arithmetic result in dependence upon said mode signal.

2. The invention in accordance with claim 1, wherein each operand has at least four bits, wherein said input logic circuit means comprises four input logic circuits each including a corresponding portion of said binary arithmetic logic and BCD correction logic, wherein each input logic circuit receives a respective pair of bits from said operands for use in producing propagate and generate signals, and wherein particular ones of said input logic circuits receive at least one additional operand bit to permit the propagate and generate signals produced thereby to take into account any inter-bit effects occurring because of correction logic operations during BCD operation.

3. The invention in accordance with claim 2, wherein said input logic circuit means provides for the production of said propagate and generate signals in response to said input operands using only two levels of gates.

4. The invention in accordance with claim 1, wherein said BCD correction logic in said input logic circuit means provides for the addition of six to one of said operands when BCD operation is indicated.

5. The invention in accordance with claim 1, wherein said means responsive to said propagate and generate signals includes look-ahead carry circuit means responsive to predetermined ones of said propagate and generate signals for producing look-ahead carries, conditional sum circuit means operating in parallel with said look-ahead carry circuit means for concurrently producing conditional sum signals in response to said propagate and generate signals which respectively assume the presence and absence of an input carry and which also take into account inter-bit carry effects, and output selection circuits responsive to said mode signal, said conditional sum signals and said look-ahead carries for producing said arithmetic result.

6. The invention in accordance with claim 5, wherein said operand comprises a plurality of 4-bit digits, wherein said means responsive to said propagate and generate signals includes digit propagate/generate circuit means for producing digit propagate and digit generate signals in response to said propagate and generate signals, and wherein said look-ahead carry means is responsive to said digit propagate and digit generate signals and an input carry.

7. The invention in accordance with claim 5, wherein said selection circuit means includes selection logic and BCD correction logic which are merged so that, when BCD operation is indicated, correction logic operations are performed concurrently with selection operations.

8. The invention in accordance with claim 7, wherein the BCD correction logic in said input logic circuit means provides for the addition of six to one of said operands when BCD operation is indicated, and wherein the BCD correction logic is in said selection circuit means provides for the subtraction of six from the sum when required to provide a proper BCD value.

9. The invention in accordance with claim 7, wherein said selection circuit means provides for the production of said arithmetic result in response to said look-ahead carry signals and said condition sum signals, said mode signal and an input carry signal using only two levels of gates.

* * * * *